United States Patent
Maruko et al.

(10) Patent No.: US 10,583,533 B2
(45) Date of Patent: Mar. 10, 2020

(54) FLUX

(71) Applicant: Senju Metal Industry Co., Ltd., Tokyo (JP)

(72) Inventors: Daisuke Maruko, Tochigi (JP); Atsumi Takahashi, Tochigi (JP); Hiroyoshi Kawasaki, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 15/999,473

(22) PCT Filed: Feb. 16, 2017

(86) PCT No.: PCT/JP2017/005713
§ 371 (c)(1),
(2) Date: Aug. 17, 2018

(87) PCT Pub. No.: WO2017/142020
PCT Pub. Date: Aug. 24, 2017

(65) Prior Publication Data
US 2019/0210167 A1    Jul. 11, 2019

(30) Foreign Application Priority Data
Feb. 18, 2016    (WO) .................. PCT/JP2016/054737

(51) Int. Cl.
| | | |
|---|---|---|
| *B23K 35/362* | (2006.01) | |
| *C08G 65/333* | (2006.01) | |
| *C08K 5/17* | (2006.01) | |
| *C08K 5/09* | (2006.01) | |
| *B23K 35/36* | (2006.01) | |
| *B23K 101/36* | (2006.01) | |

(52) U.S. Cl.
CPC ........ *B23K 35/362* (2013.01); *B23K 35/3612* (2013.01); *B23K 35/3615* (2013.01); *C08G 65/33306* (2013.01); *C08K 5/09* (2013.01); *C08K 5/17* (2013.01); *B23K 2101/36* (2018.08); *C08K 2201/014* (2013.01)

(58) Field of Classification Search
CPC .................. B23K 35/362; B23K 35/3612
USPC ......................................................... 148/23
See application file for complete search history.

(56) References Cited

U.S. PATENT DOCUMENTS

| | | | |
|---|---|---|---|
| 5,851,311 A | 12/1998 | Diamant et al. | |
| 6,159,304 A * | 12/2000 | Noguchi | B23K 35/025 148/23 |
| 10,259,083 B2 | 4/2019 | Kojima et al. | |
| 2002/0017337 A1 | 2/2002 | Arora et al. | |
| 2008/0156852 A1* | 7/2008 | Prakash | B23K 35/3613 228/256 |
| 2011/0111657 A1* | 5/2011 | Xia | C08G 18/0823 442/59 |
| 2016/0221128 A1 | 8/2016 | Kojima et al. | |

FOREIGN PATENT DOCUMENTS

| | | |
|---|---|---|
| EP | 0931622 A1 | 7/1999 |
| JP | 542389 A | 2/1993 |
| JP | 1034383 A | 2/1998 |
| JP | 2004501765 A | 1/2004 |
| WO | 9901251 A1 | 1/1999 |
| WO | 0187535 A2 | 11/2001 |
| WO | 2015037107 A1 | 3/2015 |

OTHER PUBLICATIONS

"Data Sheet on Flux", Sparkle Flux WF-6317, Sep. 8, 2010, 2 pages.

* cited by examiner

*Primary Examiner* — Weiping Zhu
(74) *Attorney, Agent, or Firm* — The Webb Law Firm

(57) ABSTRACT

Provided is a flux that is able to suppress any solder bridges even when it is applied to the narrow pitched electrodes such that the bridge occurs when using the past flux. The flux is characterized by containing 15% by mass or more and 35% by mass or less of polyoxyalkylene ethylenediamine, 2% by mass or more and 15% by mass or less of an organic acid, 10% by mass or more and 30% by mass or less of a base material, 3% by mass or more and 30% by mass or less of an amine and 20% by mass or more and 40% by mass or less of a solvent.

2 Claims, 3 Drawing Sheets

[FIG. 1]
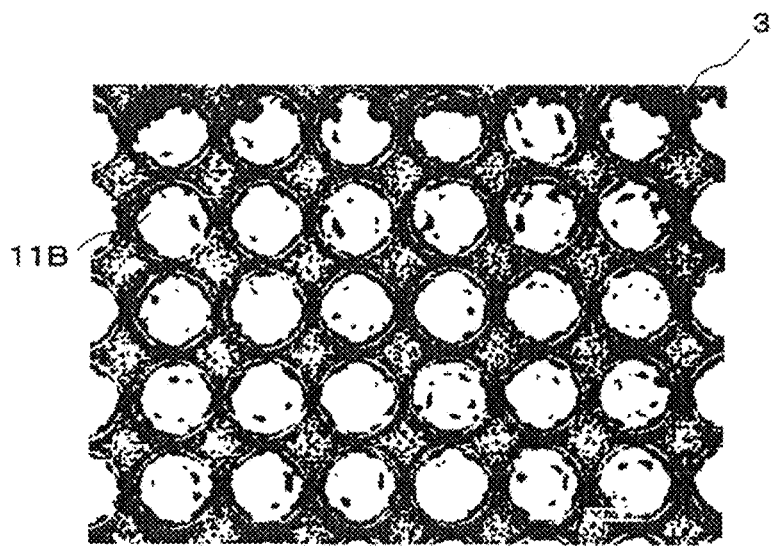
[FIG. 2]
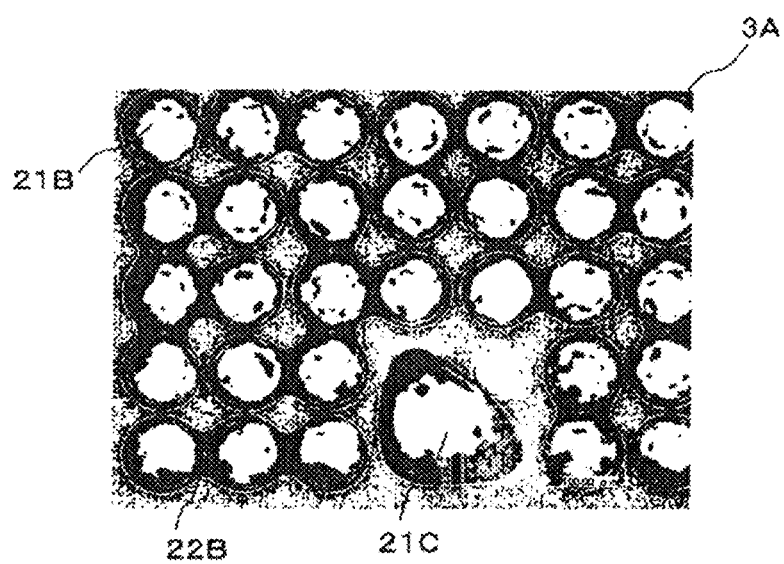

[FIG. 3]
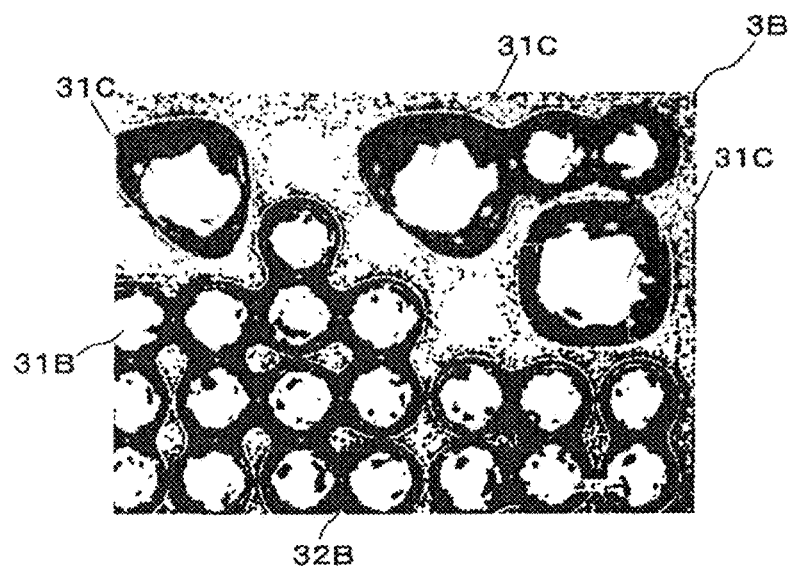
[FIG. 4A]
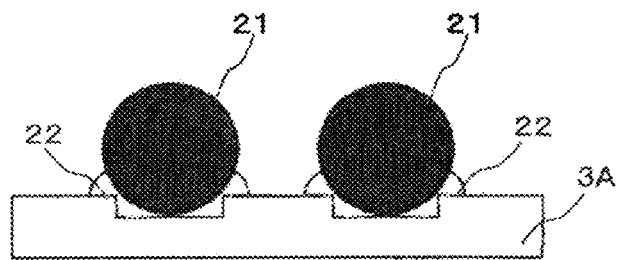

[FIG. 4B]
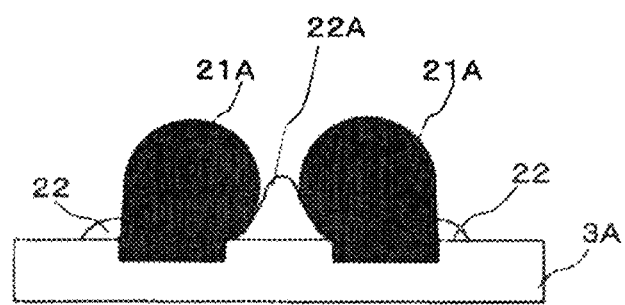
[FIG. 4C]
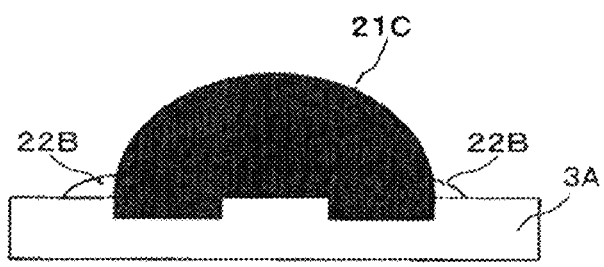

FLUX

CROSS-REFERENCE TO RELATED APPLICATIONS

This application is the United States national phase of International Application No. PCT/JP2017/005713 filed Feb. 16, 2017, and claims priority to International Application No. PCT/JP2016/054737 filed Feb. 18, 2016, the disclosures of which are hereby incorporated in their entirety by reference.

BACKGROUND OF THE INVENTION

Field of the Invention

The present invention relates to a flux containing a surfactant.

In general, the flux used for soldering has efficacy to chemically remove any metal oxides from a solder alloy and a metallic surface of an object to be joined, which is subject for soldering, and to allow metallic elements to move through a boundary between them. Therefore, the soldering using the flux enables intermetallic compounds to be formed between the solder alloy and the metallic surface of the object to be joined, thereby obtaining any firm joint.

In recent years, by miniaturization of electronic components to be soldered using the flux, narrowness of a pitch between the electrodes of the electronic component to be soldered has been advanced. When forming a solder bump by applying the flux to the electrodes and heating thing on which any core balls in which a metallic core such as Cu core is covered by the solder and any solder balls are mounted and narrowing the pitch between the electrodes, a solder bridge over the pitch is easy to generate. The solder bridge causes reliability of the soldering to be lost.

The solder bridge is easy to generate when the flux has high surface tension. The flux having the high surface tension is difficult to spread horizontally along a substrate and is easy to stay between the electrodes during the solder melting time. The flux between the electrodes draws any adjacent molten solder materials and then, the solder materials are adhered to each other to create the bridge.

To reduce the surface tension of the flux to suppress the solder bridge, a flux containing a surfactant has been known. As an example of the flux containing a surfactant, Patent Document 1 discloses a flux composition containing a rosin ester based surfactant or an amide based surfactant. Patent Document 2 discloses a flux for brazing which contains a cationic surfactant and a nonionic surfactant.

DESCRIPTION OF RELATED ART

Patent Documents

Patent Document 1: Japanese Patent Application Publication No. H05-42389
Patent Document 2: Japanese Patent Application Publication No. 2004-501765

SUMMARY OF THE INVENTION

In the past flux, even if it contains the surfactant, when the pitch between the electrodes becomes narrower, it is impossible to suppress the solder bridge so that there is a problem such that the bridge occurs.

This invention solves the above-mentioned problem and has an object to provide a flux which can suppress the bridge even when the pitch between the electrodes is narrower such that the bridge occurs in the past flux.

Technical means of this invention adapted for solving the above-mentioned problem is as follows:

(1) A flux characterized in that the flux contain 15% by mass or more and 35% by mass or less of polyoxyalkylene ethylenediamine, 2% by mass or more and 15% by mass or less of an organic acid, 10% by mass or more and 30% by mass or less of a base material, 3% by mass or more and 30% by mass or less of an amine and 20% by mass or more and 40% by mass or less of a solvent.

(2) The flux according to the above-mentioned item (1), characterized in that the polyoxyalkylene ethylenediamine is at least any of polyoxypropylene ethylenediamine, polyoxyethylene ethylenediamine, polyoxymethylethylene ethylenediamine or polyoxyethylene polyoxypropylene ethylenediamine.

By the flux according to this invention, it is possible to suppress the solder bridge when soldering the electrodes having a narrow pitch.

BRIEF DESCRIPTION OF DRAWINGS

FIG. 1 is an enlarged photograph of a flux residue after soldering in an executed example 1.
FIG. 2 is an enlarged photograph of a flux residue after soldering in a comparison example 1.
FIG. 3 is an enlarged photograph of a flux residue after soldering in a comparison example 3.
FIG. 4A is a diagram illustrating a course of bridge occurrence in the comparison example 1.
FIG. 4B is a diagram illustrating the course of bridge occurrence in the comparison example 1.
FIG. 4C is a diagram illustrating the course of bridge occurrence in the comparison example 1.

DESCRIPTION OF THE INVENTION

The following will describe fluxes according to embodiments of this invention. This invention, however, is not limited to the following specific embodiments.

[Examples of Flux Composition]

Each of the fluxes of the present embodiments contains polyoxyalkylene ethylenediamine, an organic acid, a base material, an amine and a solvent.

The polyoxyalkylene ethylenediamine is a surfactant. The following chemical formula indicates the polyoxyalkylene ethylenediamine.

[Chemical Formula 1]

R1 through R4 indicate side chains. In the polyoxyalkylene ethylenediamine, two polyoxyalkylene groups are respectively attached to N atoms at both ends of ethylenediamine.

15% by mass or more and 35% by mass or less of the polyoxyalkylene ethylenediamine used in this embodiment is added and it is preferable that the polyoxyalkylene ethylenediamine is at least any of polyoxypropylene ethylenediamine, polyoxyethylene ethylenediamine, polyoxymethylethylene ethylenediamine, or polyoxyethylene polyoxypropylene ethylenediamine.

In the polyoxypropylene ethylenediamine, two polyoxypropylene groups are respectively attached to N atoms at both ends of ethylenediamine. In the polyoxyethylene ethylenediamine, two polyoxyethylene groups are respectively attached to N atoms at both ends of ethylenediamine. In the polyoxymethylethylene ethylenediamine, two polyoxymethylethylene groups are respectively attached to N atoms at both ends of ethylenediamine.

In the polyoxyethylene polyoxypropylene ethylenediamine, at least one of polyoxypropylene group and polyoxyethylene group is attached to four side chains R1 through R4 attached to the ethylenediamine, namely, a total of four groups are attached thereto.

2% by mass or more and 15% by mass or less of the organic acid is added as activator in the flux. As the organic acid, glutaric acid, succinic acid, adipic acid, azelaic acid, glycolic acid, diglycolic acid, thioglycolic acid, thiodiglycolic acid, malic acid, tartaric acid or the like is used.

10% by mass or more and 30% by mass or less of the base material is added and as the base material, polyethylene glycol, a copolymer of polyoxyethylene and polyoxypropylene or the like is used.

3% by mass or more and 30% by mass or less of an amine is added as activator in the flux. As the amine, for example, polyoxyalkylene diamine such as polyoxyethylene diamine, polyoxypropylene diamine, and polyoxyethylene polyoxypropylene diamine, polyoxypropylene glycoltriamine, N,N,N',N'-tetrakis(2-hydroxypropyl)ethylene diamine, N,N',N'-polyoxyethylene-tallow-1,3-diaminopropane, N,N',N'-polyoxyethylene-alkyl-1, 3-diamonopropane, diethanolamine, triethanolamine, diisopropanolamine, triisopropanolamine or the like is exemplified.

20% by mass or more and 40% by mass or less of the solvent is added to dissolve solid contents in the flux. The solvent is selected from generally known glycol ether based compounds. It is preferable that the solvent does not volatilize in a low temperature range of 120 degrees C. through 150 degrees C. to allow the activator to efficiently act. When the solvent volatilizes, fluidity of the flux deteriorates so that it is difficult for the flux to wetly spread to the jointed portion. Accordingly, it is preferable that a boiling point of the solvent is 200 degrees C. or more. As the solvent, hexylene glycol, 2-ethylhexyl diglycol, phenyl glycol, butyl triglycol or the like is used.

As additives other than the above-mentioned additives to the flux, for example, a resin, a thixotropic agent, a coloring agent or the like may be suitably added so long as the quality of the flux is not deteriorated.

Executed Examples

[About Table 1]

In the examples, fluxes of the Executed Examples and the Comparison Examples having compositions shown in following Table were prepared to find out an ingredient of each composition contained in the fluxes and the following bridge suppression evaluation was performed.

(A) Evaluation Method

The fluxes of the Executed Examples and the Comparison Examples prepared in the ratios shown in the following Table were applied to substrates each having a diameter of the electrode of 180 μm and a pitch between the electrodes of 300 μm (The numerals in the flux compositions represent % by mass). It is to be noted that in the Executed Examples, polyoxypropylene ethylenediamine or polyoxyethylene polyoxypropylene ethylenediamine was selectively added as polyoxyalkylene ethylenediamine. The solder balls each having a diameter of 250 μm are mounted on each substrate to which the flux of each of the Executed Examples and the Comparison Examples was applied and soldered using solder having an alloy composition of Sn-3Ag-0.5Cu in a peak temperature of 240 degrees C. It was evaluated whether or not any bridge occurs on each substrate to which the flux of each of the Executed Examples and the Comparison Examples was applied and which was then soldered.

(B) Evaluation Criterion

◯: No bridge occurs between the electrodes.

X: At least one bridge occurs between the electrodes.

TABLE 1

| | EXECUTED EXAMPLE 1 | EXECUTED EXAMPLE 2 | EXECUTED EXAMPLE 3 | EXECUTED EXAMPLE 4 | EXECUTED EXAMPLE 5 | EXECUTED EXAMPLE 6 | EXECUTED EXAMPLE 7 |
|---|---|---|---|---|---|---|---|
| BASE MATERIAL | 10 | 30 | 20 | 20 | 23 | 20 | 20 |
| ORGANIC ACID | 10 | 10 | 5 | 10 | 2 | 15 | 12 |
| AMINE | 25 | 15 | 10 | 15 | 15 | 5 | 3 |
| POLYOXYPROPYLENE ETHYLENEDIAMINE | 35 | 20 | 30 | 15 | 35 | 25 | 30 |
| POLYOXYETHYLENE POLYOXYPROPYLENE ETHYLENEDIAMINE | | | | | | | |
| POLYOXYETHYLENE OCTADECYLAMINE ETHER | | | | | | | |
| POLYOXYETHYLENE STEARAMIDE | | | | | | | |
| SOLVENT | 20 | 25 | 35 | 40 | 25 | 35 | 35 |
| TOTAL | 100 | 100 | 100 | 100 | 100 | 100 | 100 |
| BRIDGE SUPPRESSION | ◯ | ◯ | ◯ | ◯ | ◯ | ◯ | ◯ |

| | EXECUTED EXAMPLE 8 | EXECUTED EXAMPLE 9 | COMPARISON EXAMPLE 1 | COMPARISON EXAMPLE 2 | COMPARISON EXAMPLE 3 |
|---|---|---|---|---|---|
| BASE MATERIAL | 10 | 20 | 20 | 20 | 20 |
| ORGANIC ACID | 10 | 5 | 5 | 5 | 10 |

TABLE 1-continued

| | | | | | |
|---|---|---|---|---|---|
| AMINE | 30 | 10 | 10 | 10 | 15 |
| POLYOXYPROPYLENE ETHYLENEDIAMINE | 30 | | | | |
| POLYOXYETHYLENE POLYOXYPROPYLENE ETHYLENEDIAMINE | | 30 | | | |
| POLYOXYETHYLENE OCTADECYLAMINE ETHER | | | 30 | | |
| POLYOXYETHYLENE STEARAMIDE | | | | 30 | |
| SOLVENT | 20 | 35 | 35 | 35 | 55 |
| TOTAL | 100 | 100 | 100 | 100 | 100 |
| BRIDGE SUPPRESSION | ○ | ○ | X | X | X |

As shown Table 1, in all the Executed Examples 1 through 8, contained were 10% by mass or more and 30% by mass or less of the base material, 2% by mass or more and 15% by mass or less of the organic acid, 3% by mass or more and 30% by mass or less of the amine, 15% by mass or more and 35% by mass or less of polyoxypropylene ethylenediamine, and 20% by mass or more and 40% by mass or less of the solvent. In the Executed Example 9, contained were 20% by mass of the base material, 5% by mass of the organic acid, 10% by mass of the amine, 30% by mass of polyoxyethylene polyoxypropylene ethylenediamine, and 35% by mass of the solvent. Any bridge was suppressed between the electrodes in all the Executed Examples 1 through 9.

As shown in FIG. 1, in the Executed Example 1, any bridge was suppressed between the electrodes after the soldering as the above-mentioned description.

In a step before a reflow, the solder balls were mounted on a substrate 3 and the flux of the Executed Example 1 was applied thereto. By heating it during the reflow, the flux of the Executed Example 1 liquefied to indicate a low surface tension state. When further heating it, the flux further spread. Because the flux spread thinly, the molten solder materials did not come closer to each other or were not attached to each other. Therefore, the solid solder 11B after it was melted was not made a bridge.

In the Executed Examples 2 through 9, any bridge was also suppressed like the Executed Example 1. It is supposed that the bridge suppression in the Executed Examples 1 through 9 is because the fluidized fluxes wetly spread out thinly during the reflow for a fact that the fluxes of the Executed Examples 1 through 9 contain the above-mentioned range of the polyoxypropylene ethylenediamine or polyoxyethylene polyoxypropylene ethylenediamine.

As indicated in Table 1, in the Comparison Example 1, polyoxyethylene octadecylamine ether was contained and the bridge occurred between the electrodes. In the Comparison Example 2, polyoxyethylene stearamide was contained and the bridge occurred between the electrodes. In the Comparison Example 3, any surfactant was not contained and the bridge occurred between the electrodes.

On the substrate 3A to which the flux of the comparison Example 1 was applied, as shown in FIG. 2, the solder bridge 21C occurred between the electrodes after the soldering. Further, on portions in which any solder bridge 21C did not occur, residues 22B of flux pools 22A, which will be described later, remained between the adjacent solder materials 21B which were solidified after they were melted. In the Comparison Example 2, the like bridge 21C also occurred.

In the substrate 3B to which the flux of the comparison Example 3 was applied, as shown in FIG. 3, the solder bridges 31C occurred between the electrodes after the soldering. Further, on portions in which any solder bridge 21C did not occur, residues 32B of flux pools, which will be described later, remained between the adjacent solder materials 31B which were solidified after they were melted.

FIGS. 4A through 4C illustrate a course of bridge occurrence in the Comparison Example 1. As shown in FIG. 4A, in a step before the reflow, the solder balls 21 are mounted on the substrate 3A to which the flux 22 of the Comparison Example 1 is applied.

The flux 22 of the Comparison Example 1 is liquefied by heating during the reflow, as shown in FIG. 4B. Since the substrate 3A has a narrow pitch and the liquefied flux 22 is in a high surface tension condition, the flux 22 aggregates and rises on the substrate 3A to become the flux pool 22A. By forming the flux pool 22A, the molten solder 21A is drawn to the flux pool 22A. By drawing the solder 21A, the adjacent solder materials 21A come closer to each other.

When further continuing to heat it, the adjacent solder materials 21A are adhered and as shown in FIG. 4C, the solder bridge 21C occurs. The residues 22B remain on the substrate 3A. Since the Comparison Examples 2 and 3 also generate the flux pools 22A like the Comparison Example 1, the solder bridges 21C, 31C occur and the residues 22B, 32B remain.

Although the Executed Examples 3 and 9 and the Comparison Examples 1 and 2 had all the same composition ratios of base material, the organic acid, the amine and the solvent, and contained 30% by mass of surfactant, a bridge could be suppressed in the Executed Examples 3 and 9 but any bridge could be not suppressed in the Comparison Examples 1 and 2. There were different sorts of the surfactants contained in the Executed Examples 3 and 9 and the Comparison Examples 1 and 2. The Executed Example 3 contained polyoxypropylene ethylendiamine; the Executed Example 9 contained polyoxyethylene polyoxypropylene ethylenediamine; the Comparison Example 1 contained polyoxyethylene octadecylamine ether; and the Comparison Example 2 contained polyoxyethylene stearamide, respectively. From this, it has been understood that polyoxypropylene ethylendiamine and polyoxyethylene polyoxypropylene ethylenediamine among the surfactants have rather excellent bridge suppression effect. In other words, the flux containing polyoxypropylene ethylenediamine or polyoxyethylene polyoxypropylene ethylenediamine has a high bridge suppression effect.

Although polyoxypropylene ethylenediamine or polyoxyethylene polyoxypropylene ethylenediamine was used as an example of polyoxyalkylene ethylenediamine, another polyoxyalkylene ethylenediamine may also suppress any bridge.

For example, a flux containing polyoxyethylene ethylenediamine or polyoxymethylethylene ethylendiamine in place of polyoxyethylene polyoxypropylene ethylenediamine in the flux of the Executed Example 9 indicated the same result as that of the Executed Example 9.

Moreover, in the Executed Examples, contents of the base material, the organic acid, the amine and the solvent are not limited to the above-mention contents. Although the solder balls were used in the Executed Examples, this invention is not limited thereto. Core balls each having a metal such as Cu as a core may be used.

The following has been understood from the results of Table 1:

(i) A flux containing 15% by mass or more and 35% by mass or less of polyoxyalkylene ethylenediamine, 2% by mass or more and 15% by mass or less of an organic acid, 10% by mass or more and 30% by mass or less of a base material, 3% by mass or more and 30% by mass or less of an amine and 20% by mass or more and 40% by mass or less of a solvent may suppress any bridge even when it is applied to the narrow pitched electrodes such that the bridge occurs when using the past flux.

(ii) The flux according to the above-mentioned item (1), wherein the polyoxyalkylene ethylenediamine is at least any of polyoxypropylene ethylenediamine, polyoxyethylene ethylenediamine, polyoxymethylethylene ethylenediamine or polyoxyethylene polyoxypropylene ethylenediamine is specifically preferable to be applied to the narrow pitched electrodes.

The invention claimed is:

1. A flux comprising: 15% by mass or more and 35% by mass or less of polyoxyalkylene ethylenediamine, 2% by mass or more and 15% by mass or less of an organic acid, 10% by mass or more and 30% by mass or less of a base material, 3% by mass or more and 30% by mass or less of an amine and 20% by mass or more and 40% by mass or less of a solvent.

2. The flux of claim 1, wherein the polyoxyalkylene ethylenediamine is at least one of polyoxypropylene ethylenediamine, polyoxyethylene ethylenediamine, polyoxymethylethylene ethylenediamine or polyoxyethylene polyoxypropylene ethylenediamine.

* * * * *